US008728604B2

(12) United States Patent
Setoguchi et al.

(10) Patent No.: US 8,728,604 B2
(45) Date of Patent: May 20, 2014

(54) VEHICLE INTERIOR PART (75) Inventors: Takashi Setoguchi, Toyota (JP); Jouhou Hosoi, Toyota (JP)

(73) Assignee: Kojima Press Industry Co., Ltd., Toyota-Shi, Aichi-Ken (JP)

( * ) Notice: Subject to any disclaimer, the term of this patent is extended or adjusted under 35 U.S.C. 154(b) by 207 days.

(21) Appl. No.: 13/270,285

(22) Filed: Oct. 11, 2011

(65) Prior Publication Data

US 2012/0094055 A1   Apr. 19, 2012

(30) Foreign Application Priority Data

Oct. 18, 2010   (JP) .................. 2010-233372

(51) Int. Cl.
*B32B 5/18* (2006.01)
*B32B 3/04* (2006.01)
(52) U.S. Cl.
USPC ............. 428/71; 428/126; 428/139; 264/46.5
(58) Field of Classification Search
USPC .......... 428/71, 126, 139; 264/46.5; 296/24.34
See application file for complete search history.

(56) References Cited

FOREIGN PATENT DOCUMENTS

| FR | 2578190 A1 | 9/1986 |
|---|---|---|
| GB | 859314 A | 1/1961 |
| JP | 2002210853 A | 7/2002 |
| JP | 2009067105 | 4/2009 |

OTHER PUBLICATIONS

European Search Report Dated Jun. 18, 2013; European Application No. 11173045.3 (5 p.).
Japanese Office Action Dated Apr. 1, 2014; Japanese Application No. 2010-233372 (4 p.)

*Primary Examiner* — Alexander Thomas
(74) *Attorney, Agent, or Firm* — Conley Rose, P.C.

(57) ABSTRACT

A vehicle interior part may include a base member, a foamed resin material covering a surface of the base member, and a surface cover member covering a surface of the foamed resin material and a periphery of the base member. The base member has a plurality of through holes that penetrates the same in a thickness direction thereof. The foamed resin material has a squeezed out portion that is squeezed out via the through holes formed in the base member. The squeezed out portion is adhered to the surface cover member.

2 Claims, 11 Drawing Sheets

VEHICLE INTERIOR PART

CROSS REFERENCE TO RELATED APPLICATIONS

This application claims the benefit of Japanese Patent Application No. 2010-233372 filed Oct. 18, 2010, which is incorporated herein by reference in its entirety for all purposes.

STATEMENT REGARDING FEDERALLY SPONSORED RESEARCH OR DEVELOPMENT

Not applicable.

BACKGROUND OF THE INVENTION

1. Field of the Invention

The present invention relates to a vehicle interior part and a method of manufacturing the same. More particularly, the present invention relates to a vehicle interior part having a base member, a foamed resin material covering a surface of the base member, and a surface cover member covering a surface of the foamed resin material and a periphery of the base member, and a method of manufacturing the same.

2. Description of Related Art

An opening and closing lid (consol lid) of a consol box as a known vehicle interior part is taught by, for example, Japanese Laid-Open Patent Publication Number 2009-67105. The console lid includes a base member (lid cover), a cushioning material covering a surface of the base member, and a surface cover member covering a surface of the cushioning material and a periphery of the base member. Further, a periphery of the surface cover member is folded back along the periphery of the base member, so as to form a folded back portion on a back surface of the base member.

Generally, the consol box is disposed between a driver seat and a passenger seat, so as to be used as an armrest as well as a storage box. Because the consol lid of the consol box is constructed as described above, the consol box can be comfortably used as the armrest.

However, in this known art, a folded back portion of the surface cover member of the consol lid is fixed or connected to a back surface of the base member by staples, nails or other such fixture members. Therefore, in a manufacturing process of the consol lid, a tacking (stapling) step is required in order to fix the folded back portion of the surface cover member to the back surface of the base member.

The tacking step in the manufacturing process of the consol lid is time-consuming. This time-consuming work may lead to increased manufacturing costs of the consol lid. Thus, there is a need in the art for an improved consol lid (i.e., an improved vehicle interior part).

BRIEF SUMMARY OF THE INVENTION

In one embodiment of the present invention, a vehicle interior part may include a base member, a foamed resin material covering a surface of the base member, and a surface cover member covering a surface of the foamed resin material and a periphery of the base member. The base member has a plurality of through holes that penetrates the same in a thickness direction thereof. The foamed resin material has a squeezed out portion that is squeezed out via the through holes formed in the base member. The squeezed out portion is adhered to the surface cover member.

Optionally, the surface cover member may have a folded back portion that is formed on a back surface of the base member. The squeezed out portion of the foamed resin material can be adhered to the folded back portion of the surface cover member.

According to the present embodiment, the surface cover member can be fixed to the base member by a portion of the foamed resin material. Therefore, it is not necessary to use a stapler (tacker) or other such fixture devices in order to fix the surface cover member to the base member. Thus, it is possible to easily and quickly manufacture the vehicle interior part. As a result, manufacturing costs of the vehicle interior part can be reduced.

Further, a method is provided for manufacturing a vehicle interior part including a base member having a plurality of through holes that penetrates the same in a thickness direction thereof, a foamed resin material covering a surface of the base member, and a surface cover member covering a surface of the foamed resin material and a periphery of the base member, which method may include setting the surface cover member in a forming die, disposing a foamable resin material on the set surface cover member, disposing the base member in the forming die such that the foamable resin material is positioned between the surface cover member and the base member, foaming the foamable resin material to form the foamed resin material, partially squeezing out the foamed resin material via the through holes formed in the base member to form a squeezed out portion of the foamed resin material, and adhering the squeezed out portion of the foamed resin material to the surface cover member.

Optionally, the method further may include folding back a periphery of the surface cover member to form a folded back portion of the surface cover member on a back surface of the base member. The squeezed out portion of the foamed resin material can be adhered to the folded back portion of the surface cover member in the adhering step.

Other objects, features and advantage of the present inventions will be readily understood after reading the following detailed description together with the accompanying drawings and the claims.

DETAILED DESCRIPTION OF THE INVENTION

A representative embodiment of the present invention will now be described in detail with reference to FIGS. 1 to 12.

In this embodiment, an opening and closing lid or consol lid 2 (FIGS. 11 and 12) of a consol box (not shown) is exemplified as a vehicle interior part. Further, in the drawings, the consol lid 2 is shown upside down. That is, the consol lid 2 is shown while an interior side thereof is faced upwardly.

Figure 12:
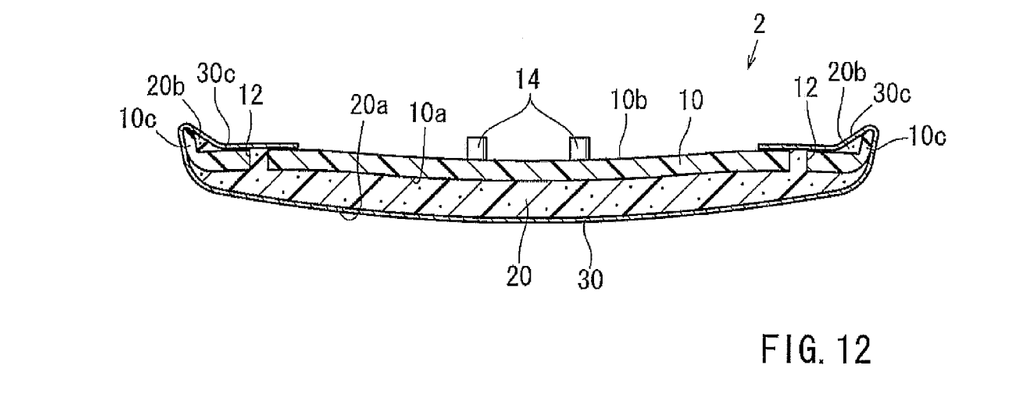
FIG. 12 is a cross-sectional view taken along line XII-XII in FIG. 11.

As best shown in FIG. 12, the consol lid 2 is composed of a base member 10, a cushion member 20 covering a surface 10a of the base member 10, and a surface cover member 30 covering a surface 20a of the cushion member 20 and a periphery 10c of the base member 10. A periphery of the surface cover member 30 is folded back along the periphery 10c of the base member 10, so that a folded back portion 30c of the surface cover member 30 can be formed in a back surface 10b of the base member 10. Further, the cushion member 20 may preferably be made of a foamed resin material, e.g., a foamed polyurethane. Therefore, the cushion member 20 may be referred to as the foamed resin material 20.

Figure 1:
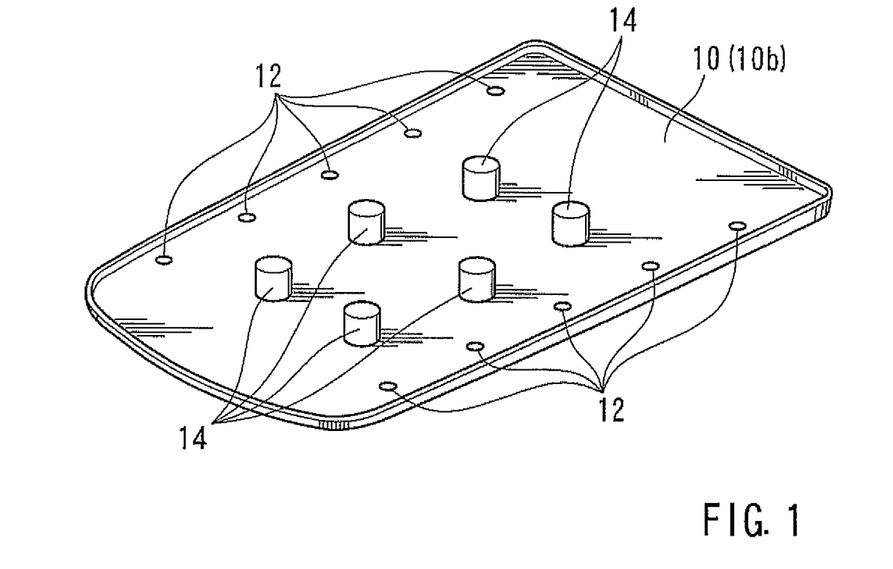
FIG. 1 is a perspective view of a base member of a consol lid according to a representative embodiment of the present invention, which view is viewed from a back surface thereof.

The base member 10 may function as a framework of the consol lid 2 and may preferably be made of a (hard) resin. As shown in FIG. 1, the base member 10 may preferably have a substantially rectangular shape. The base member 10 has a plurality of (ten in this embodiment) through holes 12 that penetrates the same in a thickness direction thereof. The through holes 12 are formed in two rows that are respectively positioned along longitudinal peripheral edges of the base member 10. Further, in this embodiment, each of the rows may preferably include five through holes 12. In addition, as shown in FIG. 1, the base member 10 has a plurality of (six in this embodiment) cylindrical ribs 14 that are formed in the back surface 10b thereof. The ribs 14 are longitudinally formed in two rows in a substantially transversely central portion of the base member 10. Further, in this embodiment, each of the rows may preferably include three ribs 14. The ribs 14 thus formed may have a specific function, which will be hereinafter described.

The consol lid 2 may preferably be manufactured using a consol lid manufacturing machine 3 (which will be hereinafter simply referred to as a manufacturing machine 3). As shown in FIGS. 2 to 10, the manufacturing machine 3 may includes a frame portion 40 that constitutes a framework of the manufacturing machine 3, and a forming portion 42 that is capable of forming the consol lid 2.

The frame portion 40 is constructed of a rectangular (plate-shaped) lower frame 50 that is disposed on a floor F, a rectangular (plate-shaped) upper frame 52 that is oppositely positioned above the lower frame 50, and four guide columns 54 (two of which are shown) that are vertically positioned between the lower frame 50 and the upper frame 52. Further, the upper frame 52 is positioned in parallel with the lower frame 50 at a desired distance. The guide columns 54 are respectively positioned to be aligned with four corners of each of the lower frame 50 and the upper frame 52 and are respectively connected thereto.

The forming portion 42 is constructed of a lower die 60 that is attached to an upper surface of the lower frame 50, a main cylinder 70 that is attached to the upper frame 52, a base plate 74 that is vertically slidably attached to the guide columns 54, and an upper die 76 that is attached to a lower surface of the base plate 74. Further, the main cylinder 70 can function as a drive source of the manufacturing machine 3.

The lower die 60 is configured to receive the foamed resin material (the foamed polyurethane) so as to form the cushion member 20 of the consol lid 2. That is, the lower die 60 has a forming cavity or recess 60a. The forming recess 60a is capable of shaping the foamed resin material into a desired shape, thereby forming the cushion member 20. Further, the forming recess 60a may preferably have a shape substantially corresponding to a profile of the base member 10. Also, the lower die 60 has a plurality of folding back devices 64 (two of which is shown) each of which is attached thereto via a bracket 62. Each of the folding back devices 64 has a folding back rod 64a that is capable of being elongated and contracted. Therefore, the folding back devices 64 are capable of folding back the periphery of the surface cover member 30 along the periphery 10c of the base member 10 when it is actuated (i.e., when the folding back rod 64a is elongated), so as to form the folded back portion 30c of the surface cover member 30 on the back surface 10b of the base member 10. Further, the lower die 60 may be referred to as a forming die.

The main cylinder 70 has a hydraulically-operated rod 72 that is capable of being elongated and contracted. The main cylinder 70 is attached to an upper surface of the upper frame 52 while the rod 72 passes through the upper frame 52 in a thickness direction. The rod 72 passing through the upper frame 52 is projected downwardly from a lower surface of the upper frame 52. Further, the rod 72 has a double-structure. That is, the rod 72 is composed of an outer (main) rod 72a and an inner (supplementary) rod 72b. The inner rod 72b is telescopically received in the outer rod 72a, so as to be capable of being elongated and contracted relative to the outer rod 72a.

The base plate 74 has four guide holes 74a that are respectively formed in four corners thereof. The guide holes 74a respectively penetrate the base plate 74 in a thickness direction. The base plate 74 is attached to the guide columns 54 while the guide columns 54 are respectively inserted into the guide holes 74a, so as to be capable of moving up and down along the guide columns 54. Further, the base plate 74 thus constructed is connected to the rod 72 of the main cylinder 70. In particular, the base plate 74 is connected to the outer rod 72a of the rod 72. Therefore, when the main cylinder 70 is actuated to elongate or contract the outer rod 72a of the rod 72, the base plate 74 (the upper die 76) can move up and down along the guide columns 54.

The upper die 76 can function to set or position the base member 10 within the forming recess 60a of the lower die 60. Therefore, a die surface 76a of the upper die 76 may preferably have a shape substantially corresponding to the profile of the base member 10. In other words, the die surface 76a of the upper die 76 may preferably have a shape substantially corresponding to the shape of the forming recess 60a of the lower die 60. Further, as shown in, for example, FIG. 6, the upper die 76 is arranged and constructed to be substantially closely received within the forming recess 60a when the lower die 60 and the upper die 76 are closed.

Further, the upper die 76 has a piston 78 that is vertically movably received in a piston bore 76b formed therein. The piston 78 is connected to the rod 72 of the main cylinder 70. In particular, the piston 78 is connected to the inner rod 72b that is projected into the piston bore 76b of the upper die 76 passing through the base plate 74 and the upper die 76. Therefore, when the main cylinder 70 is actuated to elongate or contract the inner rod 72b of the rod 72, the piston 78 can move up and down within the piston bore 76b of the upper die 76, so as to be projected and retracted relative to the die surface 76a of the upper die 76. Further, the piston 78 has a plurality of (six in this embodiment) cylindrical engagement holes 78a that are formed in a distal end surface thereof. The engagement holes 78a are arranged and constructed to engage the cylindrical ribs 14 formed in the back surface 10b of the base member 10. That is, the engagement holes 78a are formed in the same pattern as the ribs 14 and each has a shape corresponding to each of the ribs 14.

A representative process or method for manufacturing the consol lid 2 using the manufacturing machine 3 thus constructed will now be described with reference to FIGS. 2 to 10.

Figure 2:
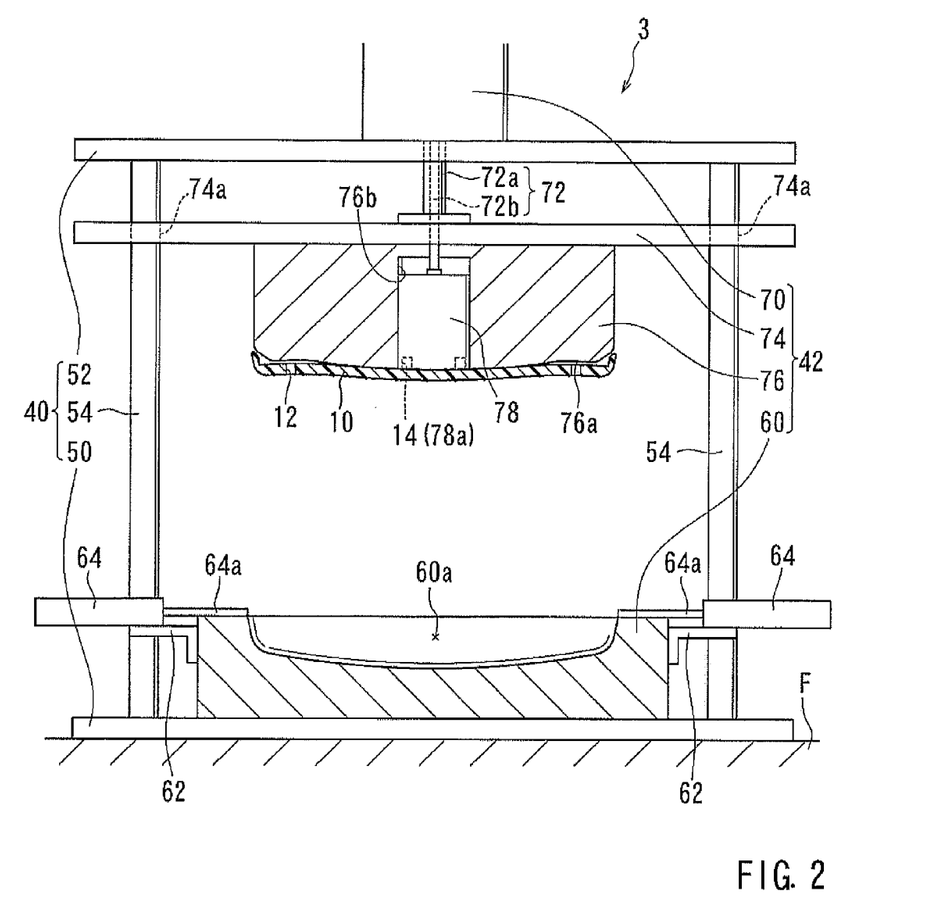
FIG. 2 is an elevational view of a manufacturing machine of the consol lid, which view illustrates a first step of a manufacturing process.

First, as shown in FIG. 2, the main cylinder 70 is actuated such that the base plate 74 (the upper die 76) can be moved to an uppermost position while the piston 78 is retracted relative to the die surface 76a of the upper die 76 (i.e., while the distal end surface of the piston 78 is substantially flush with the die surface 76a of the upper die 76). In this condition, the base member 10 is disposed on or attached to the die surface 76a of the upper die 76 by inserting the ribs 14 formed in the back surface 10b of the base member 10 into the engagement holes 78a formed in the piston 78.

Figure 3:
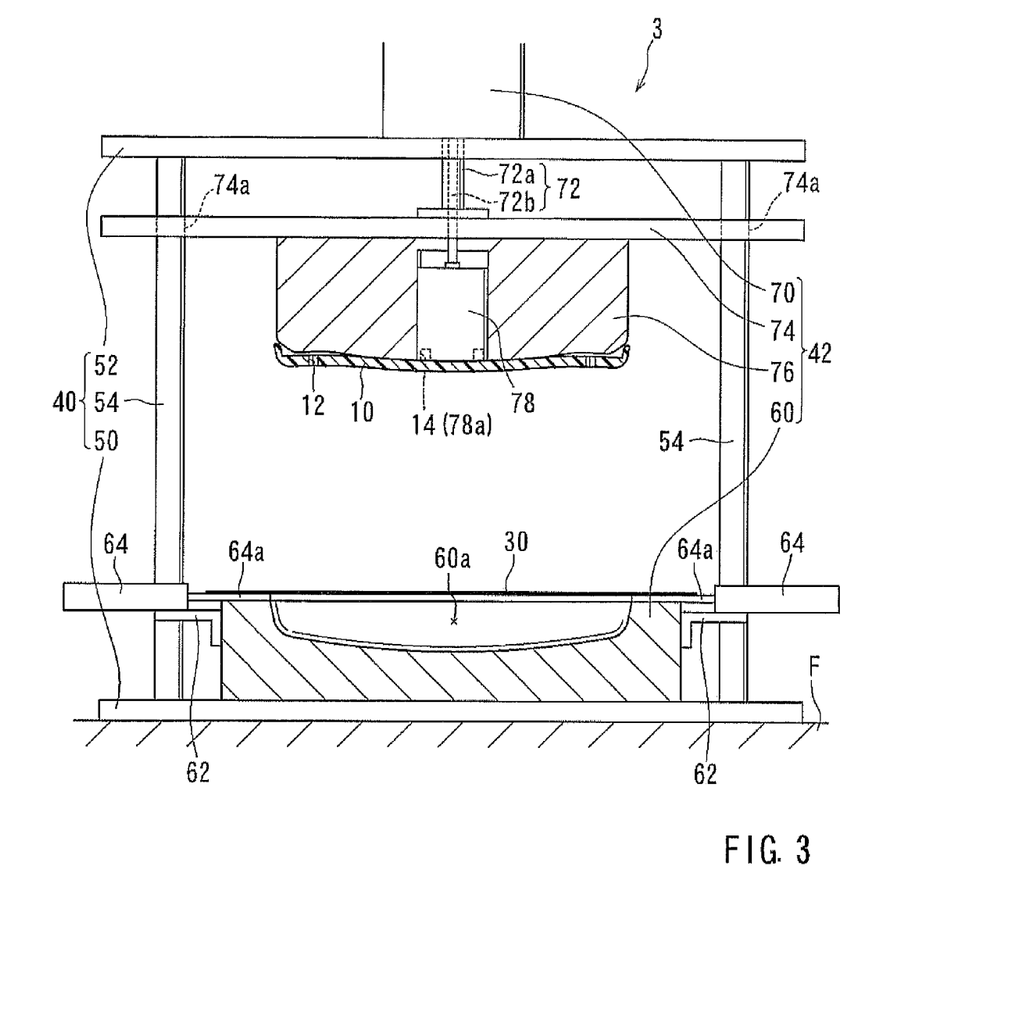
FIG. 3 is a view similar to FIG. 2, which view illustrates a second step of the manufacturing process of the consol lid.
Figure 4:
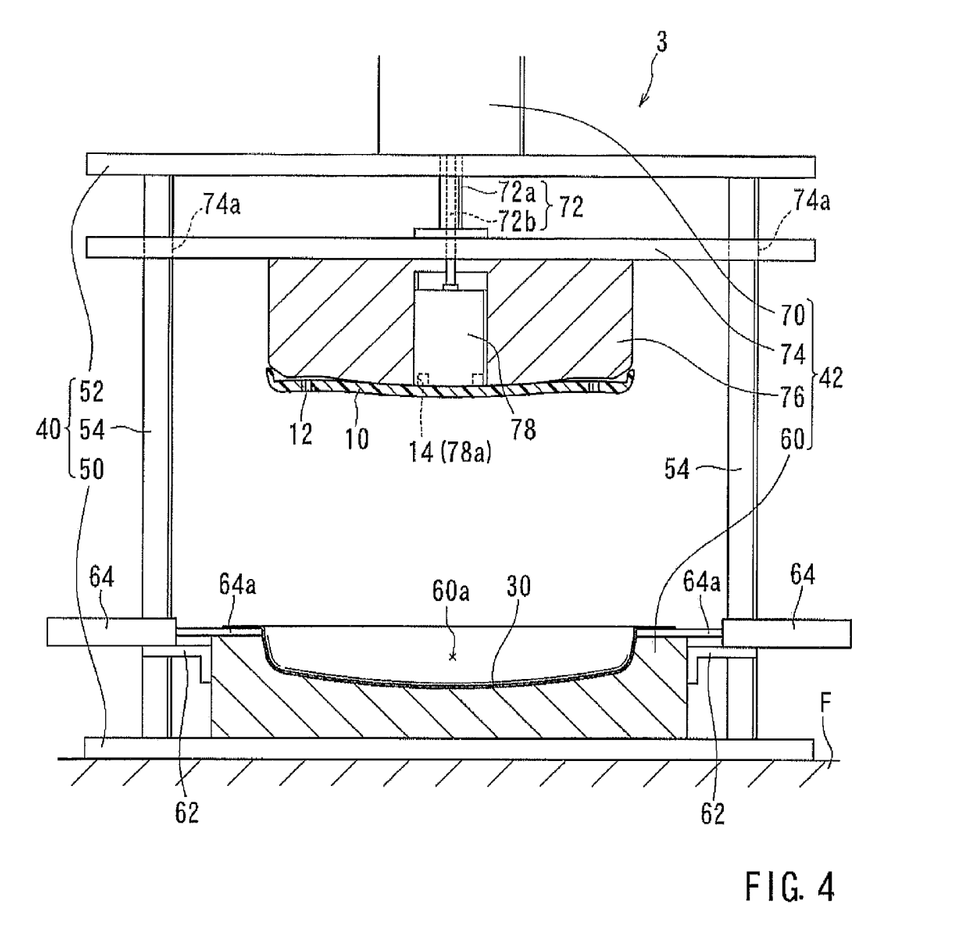
FIG. 4 is a view similar to FIG. 2, which view illustrates a third step of the manufacturing process of the consol lid.

Next, as shown in FIG. 3, the surface cover member 30 is disposed on the lower die 60 (the forming recess 60a). Thereafter, as shown in FIG. 4, a suction device (not shown) attached to the lower die 60 is actuated. As a result, the surface covering member 30 can be drawn toward a forming surface of the forming recess 60a, so as to be conformed to the forming surface. Further, the surface covering member 30 can be strongly drawn toward the forming surface of the forming recess 60a by vacuuming, so as to be shaped by the forming surface. Generally, a vacuuming operation can be performed via a plurality of holes (not shown) formed in the lower die 60.

Figure 5:
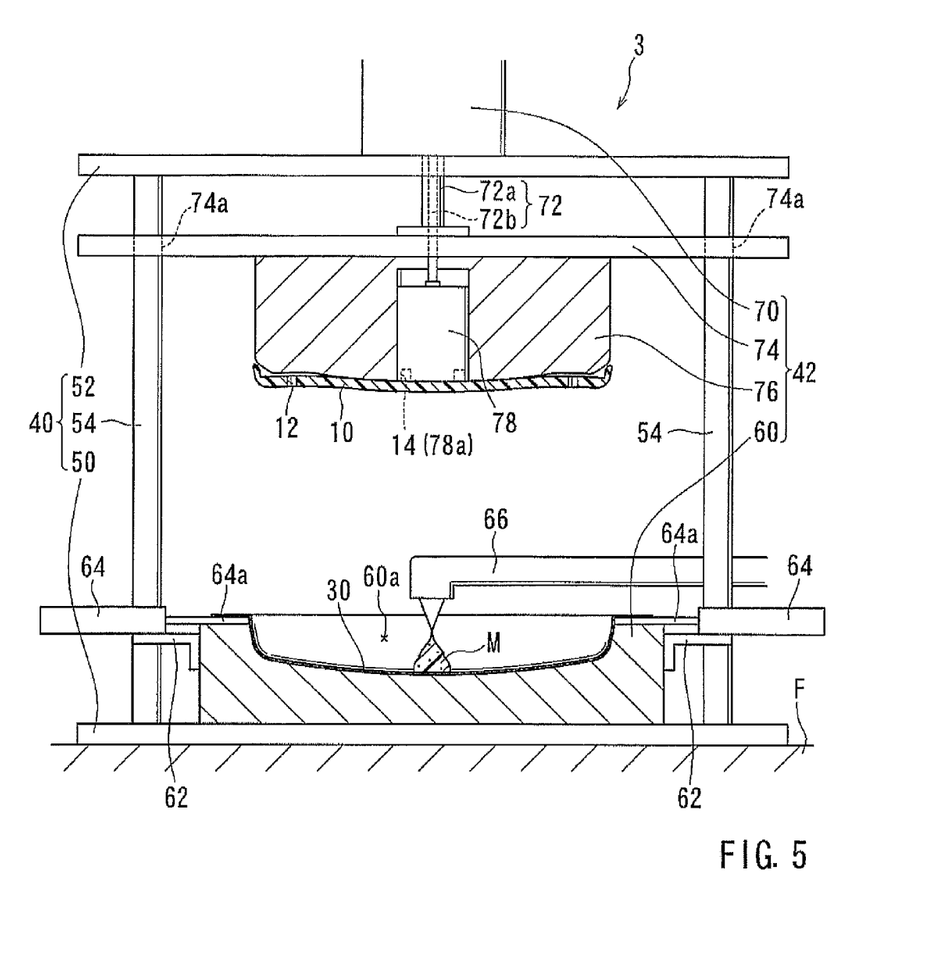
FIG. 5 is a view similar to FIG. 2, which view illustrates a fourth step of the manufacturing process of the consol lid.

Subsequently, as shown in FIG. 5, a (chemically) foamable resin material M (i.e., a raw material of the foamed resin material 20) is introduced into the forming recess 60a of the lower die 60 via a nozzle 66, so as to be disposed on the surface covering member 30. Further, the foamable resin material M may be a foamable polyurethane that can be produced by reaction of a polyol and an isocyanate.

Figure 6:
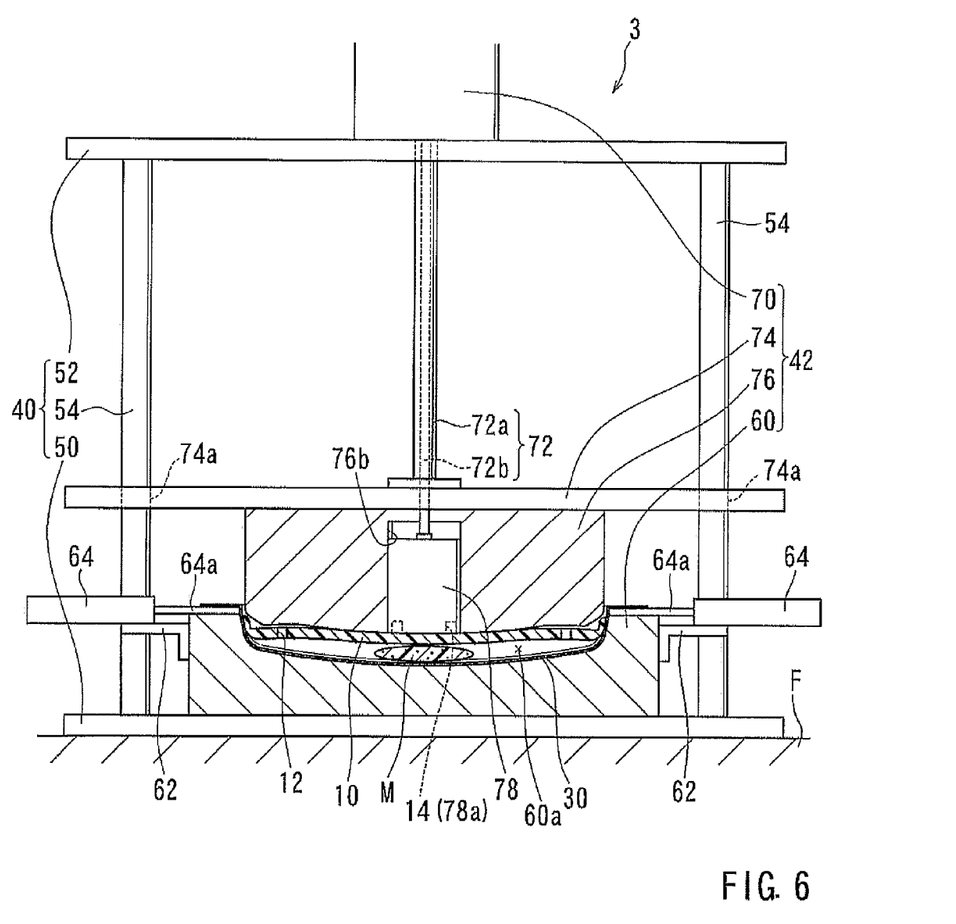
FIG. 6 is a view similar to FIG. 2, which view illustrates a fifth step of the manufacturing process of the consol lid.
Figure 7:
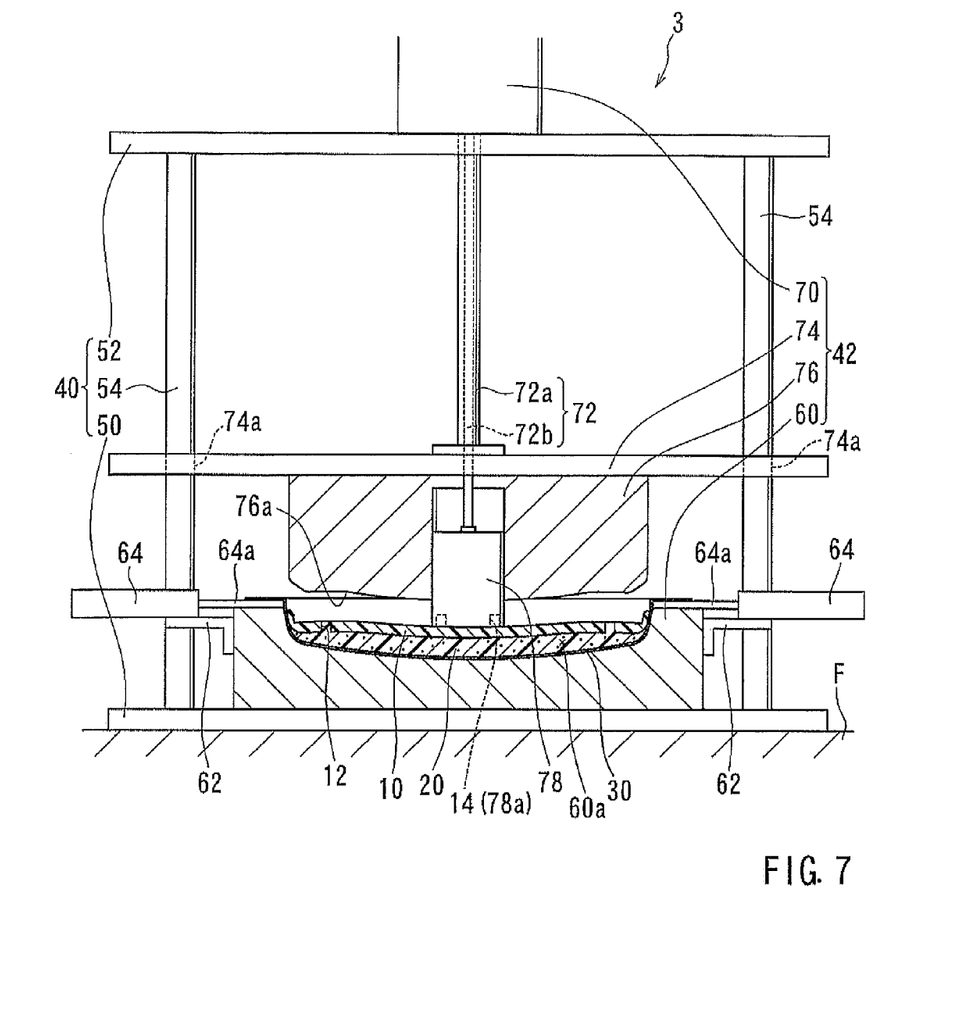
FIG. 7 is a view similar to FIG. 2, which view illustrates a sixth step of the manufacturing process of the consol lid.

Next, as shown in FIG. 6, the main cylinder 70 is actuated to elongate the rod 72 (the outer rod 72a and the inner rod 72b), so that the base plate 74 is lowered until the lower die 60 and the upper die 76 attached to the base plate 74 are closed (i.e., until the base member 10 is set or positioned within the forming recess 60a of the lower die 60). Thereafter, as shown in FIG. 7, the main cylinder 70 is further actuated to contract only the outer rod 72a without moving or contracting the inner rod 72b, so as to slightly return or lift the base plate 74 (the upper die 76) without lifting the piston 78. Simultaneously, a foaming or expanding operation of the foamable resin material M is started. As a result, the foamable resin material M is (chemically) foamed or expanded while the base member 10 is pressed by the piston 78 from above, so that the foamed resin material 20 can be formed between the surface cover member 30 and the base member 10.

Figure 8:
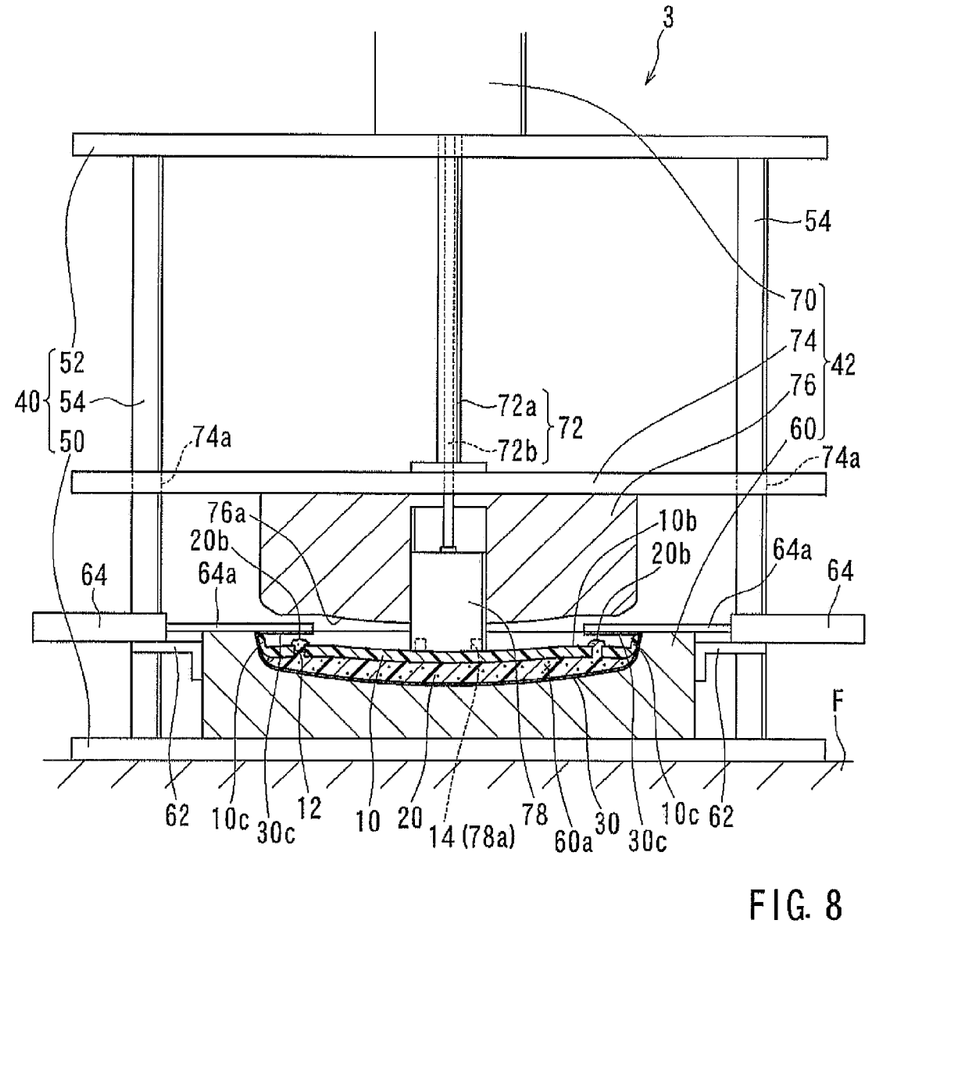
FIG. 8 is a view similar to FIG. 2, which view illustrates a seventh step of the manufacturing process of the consol lid.

After the foamed resin material 20 is formed, as shown in FIG. 8, each of the folding back devices 64 is actuated to elongate the folding back rod 64a, thereby folding back the periphery of the surface cover member 30 along the periphery 10c of the base member 10. Thus, the folded back portion 30c of the surface cover member 30 can be formed on the back surface 10b of the base member 10. Further, at this time, the foamed resin material 20 can be partially squeezed out via the through holes 12 formed in the base member 10 to form a squeezed out portion 20b of the foamed resin material 20 on the back surface 10b of the base member 10.

Figure 9:
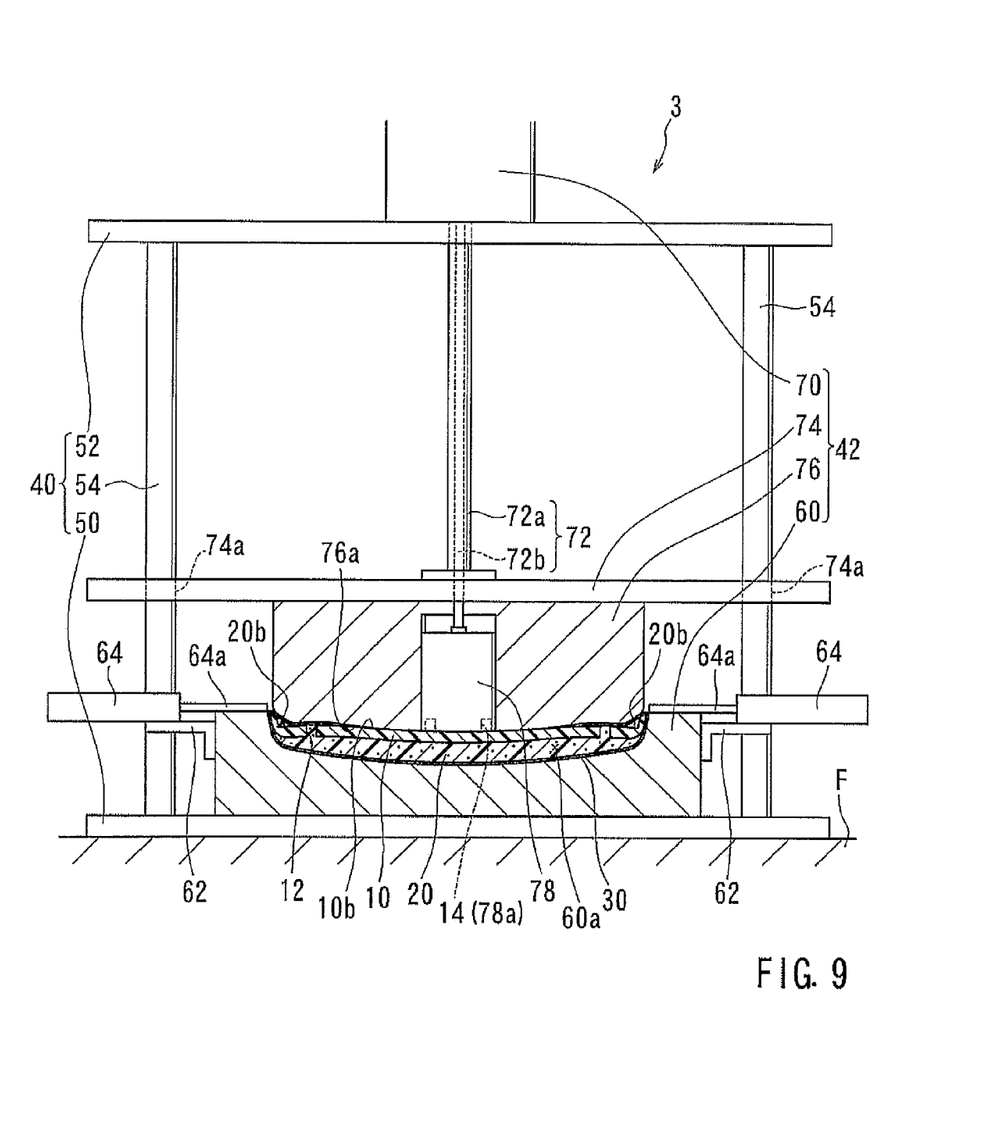
FIG. 9 is a view similar to FIG. 2, which view illustrates an eighth step of the manufacturing process of the consol lid.

Next, as shown in FIG. 9, the main cylinder 70 is further actuated to elongate only the outer rod 72a without moving or elongating the inner rod 72b (i.e., without lifting the piston 78), so as to lower the base plate 74 (the upper die 76) until the die surface 76a of the upper die 76 substantially contacts the back surface 10b of the base member 10. As a result, the folded back portion 30c of the surface cover member 30 can be pressed against the back surface 10b of the base member 10 with interleaving the squeezed out portion 20b of the foamed resin material 20 therebetween. Thus, the folded back portion 30c of the surface cover member 30 can be adhered to the back surface 10b of the base member 10 via the squeezed out portion 20b of the foamed resin material 20. Naturally, this adhering process may preferably be performed before the foamed resin material 20 is completely set or cured. The foamed resin material 20 that is not completely set can be easily enter small irregularities in a surface of the folded back portion 30c of the surface cover member 30, so that an anchor effect can be produced. Therefore, the folded back portion 30c of the surface cover member 30 can be securely adhered to the back surface 10b of the base member 10 due to the anchor effect of the foamed resin material 20.

Figure 10:
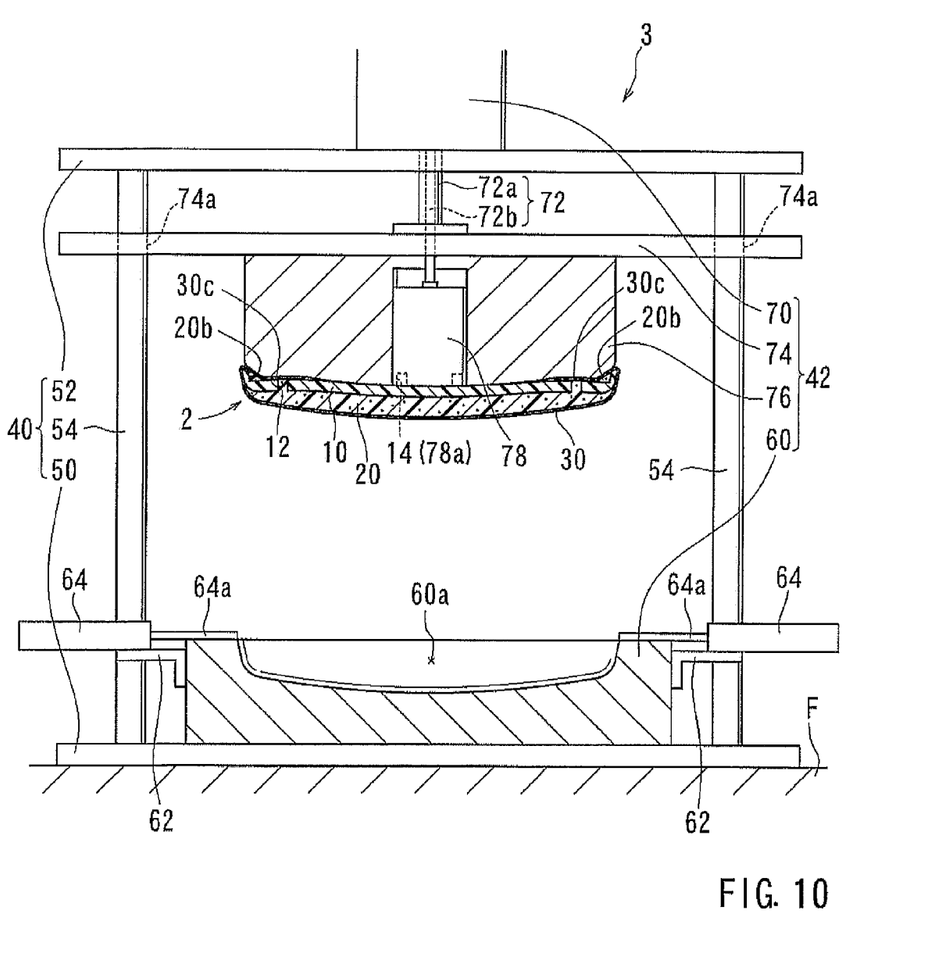
FIG. 10 is a view similar to FIG. 2, which view illustrates a ninth step of the manufacturing process of the consol lid.
Figure 11:
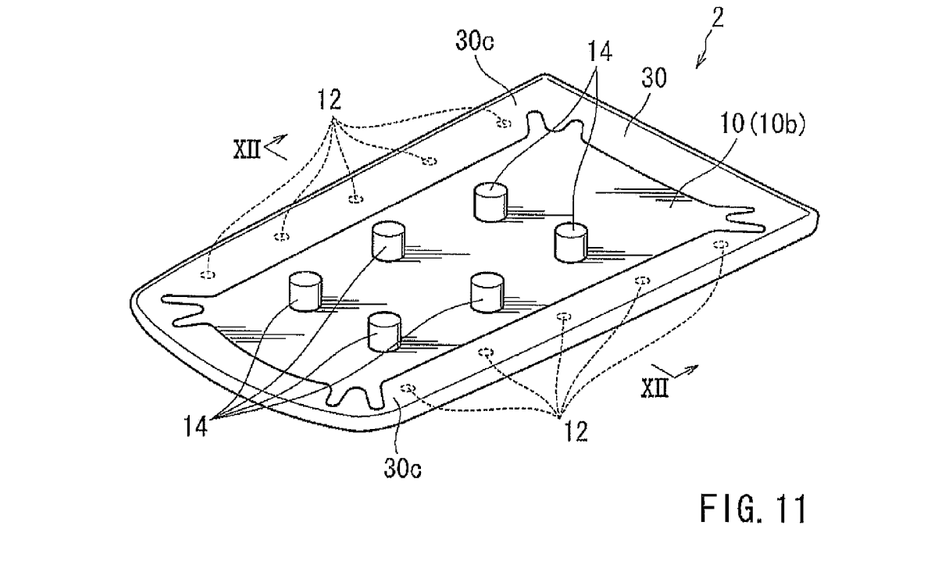
FIG. 11 is a perspective view of the consol lid manufactured by the manufacturing machine, which view is viewed from a back surface thereof.

Upon completion of foaming and curing of the foamed resin material 20, the consol lid 2 can be formed between the upper die 76 and the lower die 60. After the consol lid 2 is formed, as shown in FIG. 10, the main cylinder 70 is further actuated to contract the rod 72 (the outer rod 72a and the inner rod 72b), so that the base plate 74 can be lifted. As a result, the lower die 60 and the upper die 76 attached to the base plate 74 are opened. At this time, the formed consol lid 2 is held on the die surface 76a of the upper die 76 by engagement of the inserting the ribs 14 formed in the back surface 10b of the base member 10 and the engagement holes 78a formed in the piston 78. The consol lid 2 can be easily disengaged from the upper die 76 by simply removing the inserting the ribs 14 from the engagement holes 78a. Thus, the consol lid 2 can be obtained (FIGS. 11 and 12).

According to the present method for manufacturing the consol lid 2, the folded back portion 30c of the surface cover member 30 can be adhered to the back surface 10b of the base member 10 by the squeezed out portion 20b of the foamed resin material 20 when the foamed resin material 20 is formed. Therefore, it is not necessary to fix or connect the folded back portion 30c of the surface cover member 30 to the back surface 10b of the base member 10 by staples, nails or other such fixture members. That is, the method for manufacturing the consol lid 2 can be simplified. As a result, manufacturing costs of the consol lid 2 can be reduced.

Further, as previously described, the folded back portion 30c of the surface cover member 30 can be reliably adhered to the back surface 10b of the base member 10 due to the anchor effect the foamed resin material 20. In addition, the folded back portion 30c of the surface cover member 30 can be uniformly adhered to the back surface 10b of the base member 10 without producing wrinkling. Therefore, the manufactured consol lid 2 can have a good appearance.

Various changes and modifications may be made to the present invention without departing from the scope of the invention. For example, in the embodiment, the folded back portion 30c of the surface cover member 30 can be adhered to the back surface 10b of the base member 10 before the foamed resin material 20 is completely set or cured. However, the folded back portion 30c of the surface cover member 30 can be adhered to the back surface 10b of the base member 10 after the foamed resin material 20 is completely set or cured.

Naturally, in this case, it is necessary to melt the cured squeezed out portion 20b of the foamed resin material 20 by heating the same in order to adhere the folded back portion 30c of the surface cover member 30 to the back surface 10b of the base member 10.

In the representative embodiment, the consol lid 2 of the consol box is exemplified as the vehicle interior part. However, the vehicle interior part is not limited to the consol lid 2 and may be an armrest.

Further, in this embodiment, the foamable polyurethane that can be produced by reaction of a polyol and an isocyanate is used as the foamable resin material M (the raw material of the foamed resin material 20). However, the foamable resin material M may be various adhesive foamable resin materials provided that they can be squeezed out via the through holes 12 formed in the base member 10 to form the squeezed out portion 20b of the foamed resin material 20 on the back surface 10b of the base member 10.

Further, the foamable resin material M can be replaced with a material that cannot be chemically foamed. Naturally, in this case, such a material must be foamed or expanded by various foaming methods (e.g., a mechanical foaming method). Also, the foamable resin material M can be replaced with a material that is previously foamed.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:
1. A vehicle interior part, comprising:
    a base member,
    a foamed resin material covering a surface of the base member, and
    a surface cover member covering a surface of the foamed resin material and a periphery of the base member,
    wherein the base member has a plurality of through holes that penetrates the same in a thickness direction thereof,
    wherein the foamed resin material has a squeezed out portion that is squeezed out via the through holes formed in the base member,
    wherein the surface cover member has a folded back portion that is formed on a back surface of the base member, and
    wherein the squeezed out portion of the foamred resin material is adhered to the folded back portion of surface cover member.

2. A method for manufacturing a vehicle interior part including a base member having a plurality of through holes that penetrates the same in a thickness direction thereof, a foamed resin material covering a surface of the base member, and a surface cover member covering a surface of the foamed resin material and a periphery of the base member, comprising:
    setting the surface cover member in a forming die,
    disposing a foamable resin material on the set surface cover member,
    disposing the base member in the forming die such that the foamable resin material is positioned between the surface cover member and the base member,
    foaming the foamable resin material to form a foamed resin material,
    partially squeezing out the foamed resin material via the through holes formed in the base member to form a squeezed out portion of the foamed resin material,
    folding back a periphery of the surface cover member to form a folded back portion of the surface cover member on a back surface of the base member, and
    adhering the squeezed out portion of the foamed resin material to the folded back portion of the surface cover member.

* * * * *